(12) United States Patent
Dolev et al.

(10) Patent No.: US 12,541,596 B2
(45) Date of Patent: Feb. 3, 2026

(54) VERIFIABLE COMPUTING USING COMPUTATION FINGERPRINT WITHIN FULLY HOMOMORPHIC ENCRYPTION (FHE)

(71) Applicant: B.G. NEGEV TECHNOLOGIES AND APPLICATIONS LTD., AT BEN-GURION UNIVERSITY, Beer Sheva (IL)

(72) Inventors: Shlomi Dolev, Omer (IL); Arseni Kalma, Rishone LeTsiyon (IL)

(73) Assignee: B.G. NEGEV TECHNOLOGIES AND APPLICATIONS LTD., AT BEN-GURION UNIVERSITY, Beer Sheva (IL)

( * ) Notice: Subject to any disclaimer, the term of this patent is extended or adjusted under 35 U.S.C. 154(b) by 210 days.

(21) Appl. No.: 18/279,720

(22) PCT Filed: Mar. 3, 2022

(86) PCT No.: PCT/IL2022/050239
§ 371 (c)(1),
(2) Date: Aug. 31, 2023

(87) PCT Pub. No.: WO2022/185316
PCT Pub. Date: Sep. 9, 2022

(65) Prior Publication Data
US 2024/0176883 A1    May 30, 2024

Related U.S. Application Data

(60) Provisional application No. 63/155,755, filed on Mar. 3, 2021.

(51) Int. Cl.
*G06F 21/57*   (2013.01)
*H04L 9/00*    (2022.01)

(52) U.S. Cl.
CPC .............. *G06F 21/57* (2013.01); *H04L 9/008* (2013.01)

(58) Field of Classification Search
None
See application file for complete search history.

(56) References Cited

U.S. PATENT DOCUMENTS

| | | |
|---|---|---|
| 2012/0317421 A1 | 12/2012 | Gounares |
| 2018/0288023 A1 | 10/2018 | Hibshoosh et al. |

(Continued)

OTHER PUBLICATIONS

Communication and Supplementary European Search Report for EP22762742, mailed Jul. 26, 2024 (11 pages).

(Continued)

*Primary Examiner* — William J. Goodchild
(74) *Attorney, Agent, or Firm* — Roach Brown McCarthy & Gruber, P.C.; Kevin D. McCarthy (57) ABSTRACT

A system for verifying the execution of requested computation tasks, delegated by a computerized delegator device, to one or more computerized devices executing the tasks, comprising one or more computerized devices that contain one or more processors being adapted to define an input data for each delegated computation task; add to the input data, one or more computation fingerprints being executable encrypted input control bits, capable of detecting deviation from each requested computation task; allow the delegator to calculate the computation fingerprints once, by executing the requested computation tasks on predetermined random base values, to obtain an a-priori fingerprint result; couple the base values to each requested computation task; allow the one or more computerized devices to execute each requested computation task along with the base values, for returning an output consisting of a combination of a computed task result section and a calculated fingerprint result section; verify the returned output by comparing the a-priori (Continued)

| Input | Output |
|---|---|
| 0...00 | $Output_0$ |
| 0...01 | $Output_1$ |
| 0...10 | $Output_2$ |
| .. | .. | fingerprint result to the calculated fingerprint and accepting the returned output if and only if the returned fingerprint result was identical to the a-priori fingerprint result; and use the a-priori fingerprint result or new verified result to verify further requested computation tasks delegated to the same one or more computerized devices.

6 Claims, 3 Drawing Sheets

(56) References Cited

U.S. PATENT DOCUMENTS

| | | | |
|---|---|---|---|
| 2020/0036510 A1* | 1/2020 | Gomez | G06N 3/08 |
| 2020/0136797 A1* | 4/2020 | Yu | H04L 9/008 |
| 2020/0151356 A1* | 5/2020 | Rohloff | G06F 21/6245 |
| 2023/0019214 A1* | 1/2023 | Prothero | H04L 9/008 |
| 2023/0185537 A1* | 6/2023 | Zhang | G06F 7/728 |
| | | | 708/491 |

OTHER PUBLICATIONS

Poon et al.: "Scanning for Viruses on Encrypted Cloud Storage", 2016 Intl IEEE Conferences on Ubiquitous Intelligence & Computing, Advanced and Trusted Computing, Scalable Computing and Communications, Cloud and Big Data Computing, Internet of People, and Smart World Congress (UIC/ATC/SCALCOM/CBDCOM/IOP/SMARTWORL, Jul. 18, 2016 (Jul. 18, 2016), pp. 954-959, XP033043174, DOI: 10.1109/UIC-ATC-SCALCOM-CBCOM-IOP-SMARTWO RLD.2016.0150 [retrieved.

Wang et al.: "Malicious Code Detection for Trusted Execution Environment Based on Paillier Homomorphic Encryption", IEICE Transaction on Communication, vol. E103.B, No. 3, Mar. 1, 2020 (Mar. 1, 2020), pp. 155-166, XP093183264, up ISSN: 0916-8516, DOI: 10.1587/transcom.2019EBP3098 Retrieved from the Internet: URL:https://www.jstage.jst.go.jp/article/transcom/E103.B/3/E103.B_2019EB P3098/_pdf> (12 pages).

Babaeer et al.: "Efficient and Secure Data Transmission and Sinkhole Detection in a Multi-Clustering Wireless Sensor Network Based on Homomorphic Encryption and Watermarking", IEEE Access, IEEE, USA, vol. 8, May 14, 2020 (May 14, 2020), pp. 92098-92109, XP011790557, DOI: 10.1109/ACCESS.2020.2994587 [retrieved on May 26, 2020] (12 pages).

International Search Report for PCT/IL2022/050239; mailed Jul. 14, 2022; 3 pages.

Written Opinion of the International Searching Authority for PCT/IL2022/050239; mailed Jul. 14, 2022; 5 pages.

Aguiar, Everaldo; Zhang, Yihua; Blanton, Marina; "An overview of issues and recent developments in cloud computing and storage security"; High Performance Cloud Auditing and Applications, 2014, 3-33, Retrieved from the Internet: <URL: http://www.acsu.buffalo.edu/~mblanton/publications/cloud-chapter.pdf> Aug. 1, 2013— 31 pages.

* cited by examiner

| Input | Output |
|---|---|
| 0...00 | $Output_0$ |
| 0...01 | $Output_1$ |
| 0...10 | $Output_2$ |
| .. | .. |

| Input as<br>$Value\ FP_a\ FP_m$ | Output as<br>$Value\ FP_a\ FP_m$ |
|---|---|
| 000 01 00 | 000 01 01 |
| 001 10 00 | 010 10 01 |
| 010 11 00 | 100 11 01 |
| .. | .. |

Fig. 4

| Operation | Values |
|---|---|
| $2 + 3$ | 00000010 00010000<br>00000011 00001000 |
| $LUT(5) = 32$ | 00000101 00011000<br>00100000 00011001 |
| $32 + 32$ | 00100000 00011001<br>00100000 00100000 |
| $LUT^{-1}(64) = 6$ | 01000000 00111001<br>00000110 00111010 |
| $6 + 1$ | 00000110 00111010<br>00000001 01000000 |
| $LUT(7) = 128$ | 00000111 01111010<br>10000000 01111011 |

Fig. 5

VERIFIABLE COMPUTING USING COMPUTATION FINGERPRINT WITHIN FULLY HOMOMORPHIC ENCRYPTION (FHE)

FIELD OF THE INVENTION

The present invention relates to the field of cyber security. More particularly, the invention relates to a system and method for verifying computation tasks, delegated by a delegator to computerized devices, with minimal additional overhead.

BACKGROUND OF THE INVENTION

Computation delegation is widely used in distributed computing as an important computing resource, particularly in could computing. In this scheme, a delegated computing task is sent to a cloud for execution, while masking the task, such that the computing could does not disclose it before or after computation.

The fundamental problem of how can a delegator verify that the delegates performed the computation correctly, without running the computation itself, is formed in [1] and arose as early as 1992.

Other methods, such as those described in [2] or [3] advanced the field of computation delegation by expanding current theoretical models, such as random oracle or standard assumption models. However, these solutions failed to offer a sufficiently practical solution.

Other methods, such as the ones presented in [4] consider hardware design of arithmetic circuits. This problem was also stated explicitly in [5]. The mechanism of general secure computation outsourcing was recently shown to be feasible in theory, but to design mechanisms that are practically efficient remains a very challenging problem. [6] Stated that zero-knowledge proofs do exist outside the domain of cryptography and number theory, using no assumptions. One of the only practical breakthroughs, that resulted in a real working application, is the SNARK [7]. Although it is designed to be practical, and having an extremely efficient verification procedure, the complexity of creating the verification itself is poly-logarithmic to the length of the original computation and may nullify the benefit in delegating the computation. In addition, it only works on known (cleartext) input, while typically, delegation of computing is based on encrypted inputs and FHE.

Several other approaches were suggested in [8-13] verify computations with schemes involving the usage of authentication tags, signatures or different MACs, however none of them suggest to couple the result with the indication in a monolithic fashion. A separate indication on a correct computation does not imply that another instance of the computation is also correct, as presented in those schemes. Other approaches are based on check-able traces of the computation such as MPC-in-the-head or the probabilistic check-able proofs (PCP) [15], where several randomly (or blindly) chosen steps in the MPC/PCP can be checked to validate the computation. These approaches either requires space overhead and/or interactions with the servers. In some scenarios a user cannot change the (e.g., the server is in a cloud computing scenario) system when an indication on wrong computation is received. Moreover, the servers may decide to act maliciously in burst, so repetition may not assist in learning the number of repetitions needed, let alone the overhead needed in repeating the computation. Moreover, a more efficient approach is proposed by coupling the computation values with the verification section in the same unit of computation, while maintaining a "pre-processing" model [16-18] which can work in a transitive manner, and in proportion of log 2 to the number of inputs.

Fully Homomorphic Encryption (FHE) [19, 20] enables computation of arbitrary functions on encrypted data without knowing the secret key. Many of the FHE schemes (e.g., [21-34]) followed Gentry's suggested blueprint [19]. FHE becomes more and more practical, and in many scenarios include the evaluation of various calculation or algorithms on encrypted and sensitive data [35-39]. FHE was implemented by several open-source libraries, where the libraries the focus is on Microsoft's SEAL and IBM HELib [41], each implementing different schemes from the ones stated above, where BGV and CKKS schemes are of interest. Unfortunately, while FHE copes with honest but curious servers, it is not designed to cope with malicious/Byzantine servers. In the cloud the identity of the server that executes the delegated computing task is not known, and therefore there can be no binding of a server to (wrong) results, and later re-execution may yield the same no binding results. Thus, malicious servers can resume their activity forever.

It is therefore an object of the present invention to provide a system and method for verifying delegated computation tasks with minimal overhead.

It is another object of the present invention to provide a system and method for safely, delegated by a delegator to one or more computerized devices, using Fully Homomorphic Encryption (FHE).

It is a further object of the present invention to provide a system for detecting deviation from requested delegated computation tasks, delegated by a delegator to one or more computerized devices.

It is still another object of the present invention to provide a system and method for verifying, delegated by a delegator to one or more computerized devices, where the input is represented as encrypted bits or an encrypted value (word).

It is yet another object of the present invention to provide a system and method for verifying, delegated by a delegator to one or more computerized devices, with or without delivering a public key to a server that executes the delegated computation task.

Other objects and advantages of the invention will become apparent as the description proceeds.

SUMMARY OF THE INVENTION

A method for verifying the execution of requested computation tasks, delegated by a computerized delegator device, to one or more computerized devices executing the tasks, comprising:
  a) defining an input data for each delegated computation task;
  b) adding to the input data, one or more computation fingerprints being executable encrypted input control bits, capable of detecting deviation from each requested computation task;
  c) allowing the delegator to calculate the computation fingerprints once, by executing the requested computation tasks on predetermined random base values, to obtain an a-priori fingerprint result;
  d) coupling the base values to each requested computation task;
  e) allowing the one or more computerized devices to execute each requested computation task along with the base values, for returning an output consisting of a combination of a computed task result section and a calculated fingerprint result section;

f) verifying the returned output by comparing the a-priori fingerprint result to the calculated fingerprint and accepting the returned output if and only if the returned fingerprint result was identical to the a-priori fingerprint result; and g) using the a-priori fingerprint result or new verified result to verify further requested computation tasks delegated to the same one or more computerized devices.

The input control bits may be encrypted using Fully Homomorphic Encryption (FHE).

The input data and the input control bits may be encrypted together using Fully Homomorphic Encryption (FHE).

The requested computation tasks may include additions of encrypted values.

The requested computation tasks may include multiplications of encrypted values.

The requested computation tasks may include vector representation of the input data.

Multiplications of encrypted values may be performed by additions of the logarithmic representations of the encrypted values, followed by exponentiation.

Black box additions may be performed by the one or more computerized devices.

Parts of the variables may be used for computation verification by fingerprint calculation, while the other parts are used for the actual calculation.

The input data may have computer word granularity.

The computer word granularity, the verification and the actual calculation representation sections within the computer word may be distinct, such that the verification part is fixed across all input computer words.

For Single Instruction Multiple Data (SIMD), the computation fingerprint may be fixed to a certain index in the input vector across all input vectors.

After calculating the value of all the possible rows, the results may be summed, where there are zeros for all the rows, except for at most one row, which represents the received encrypted input, such that the calculation of the one row will result in the expected output that corresponds to the input.

Computer word schemes may be designed using arithmetic circuits that represent polynomials.

The fingerprint may be binary and its position within the input data is unknown.

The expected result of the fingerprint calculation may be reused or reconstructed over different inputs.

Upon detecting a carry operation in the fingerprint result section, a reset default value may be assigned for nullifying the computed task result.

The computation may consist of executions of AND, OR and NOT bitwise operators.

The fingerprint may be an integer fingerprint, the fingerprint value changes after each addition by more than a single bit.

Multiplications may be verified using discrete logarithmic representation with fingerprints as data inputs.

The computing server may use an LUT to convert the inputs to discrete logarithmic values and to exponentiate the result back before adding.

Black box operations that enforce the ordered operations may be applied for multiplications exponentiation using logarithmic representation, while preserving computation fingerprints and operating additions.

The computational fingerprint may be incorporated into SIMD manipulated data structures indicating wrong execution order and overflows.

system for verifying the execution of requested computation tasks, delegated by a computerized delegator device, to one or more computerized devices executing the tasks, comprising one or more computerized devices that contain one or more processors being adapted to:

a) define an input data for each delegated computation task;

b) add to the input data, one or more computation fingerprints being executable encrypted input control bits, capable of detecting deviation from each requested computation task;

c) allow the delegator to calculate the computation fingerprints once, by executing the requested computation tasks on predetermined random base values, to obtain an a-priori fingerprint result;

d) couple the base values to each requested computation task;

e) allow the one or more computerized devices to execute each requested computation task along with the base values, for returning an output consisting of a combination of a computed task result section and a calculated fingerprint result section;

f) verify the returned output by comparing the a-priori fingerprint result to the calculated fingerprint and accepting the returned output if and only if the returned fingerprint result was identical to the a-priori fingerprint result; and g) use the a-priori fingerprint result or new verified result to verify further requested computation tasks delegated to the same one or more computerized devices.

BRIEF DESCRIPTION OF THE DRAWINGS

The above and other characteristics and advantages of the invention will be better understood through the following illustrative and non-limitative detailed description of preferred embodiments thereof, with reference to the appended drawings, wherein.

DETAILED DESCRIPTION OF THE INVENTION

The present invention relates to a system and method for verifying the execution of delegated computation tasks, delegated by a delegator to one or more computerized devices (such as remote computers, remote servers or hardware devices that contain one or more processors), with minimal additional overhead by adding computation fingerprints (being executable encrypted input control bits that are calculated a-priori, being capable of detecting deviation from each requested computation task) that can detect deviation from the requested computation (that are analogous to error detection codes). The computation fingerprints will be performed exactly once by the delegator, by executing the requested computation on some random base values that may act as a witness for future calculations of the same circuit or program or procedure. The result of this calculation will be used, as the same base values will be coupled to all other future computation requests. The returned calculation result (the output consists of a combination of a computed task result section and a calculated fingerprint result section) will be accepted if and only if the a-priori fingerprint result has been received from the server as previously calculated.

The present invention also provides a method for using Fully Homomorphic Encryption (FHE) to verify computations with minimal additional overhead, using only part of the variables length for verification. This method supports the addition of encrypted values as well as multiplication of encrypted values by the addition of their logarithmic representations and is based on a separation between hardware functionalities. The computer or server performs black box additions and is based on the separation of server (device/hardware) that may perform additions of logarithmic values and exponentiation.

Thus, having FHE inputs and a desired arithmetic circuit, any entity following our scheme can delegate the required computation to any other party, have a with high probability guaranteed that the computation was made as requested, and accomplish this procedure by computing the calculation exactly once, with no redundancy.

The computer operations are restricted and parts of the variable are used for computation verification (computation fingerprint), while the other parts are used for the actual calculation. The verification part holds the FHE value, the calculated result of which is known and will be checked against the returned FHE value.

It will be shown that a server with bit computation granularity can return consistent encrypted wrong results even when the public key is not provided. For computer word granularity, the verification and the actual calculation parts are separated. The verification part (i.e., the consecutive bits from the LSB to the MSB of the variables) is fixed across all input words. In case of Single Instruction Multiple Data (SIMD), the computation fingerprint is fixed to a certain index in the input vector across all input vectors.

Consistent Wrong FHE Results in Bit Granularity

An impossibility result for detecting wrong computation is provided by repeating the computing, possibly using different (FHE) keys and comparing the decrypted results when the computer is allowed to perform bitwise operations.

Blind Conditioning

It was found that encryption cannot prevent some possible conditioned computation. An important feature possible on homomorphically encrypted data, which is the ability to perform blind if on homomorphically encrypted data. This does not allow to read the input data as plaintext. Rather, it allows running calculations and conditions blindly on (encrypted) data.

Blind execution of a basic condition is demonstrated: if a specific bit b is true (e.g., represented as an encrypted 1) output f(x), otherwise, output g(x). The bit b is used and $b \cdot f(x)+(enc(1)-b) \cdot g(x)$ is calculated. The implementation is done as described in Algorithm 1, by having a specific bit as the conditioned value, a function f(x) for the positive case, and another function g(x) for the negative case.

Algorithm 1 Implementation of Blind Conditioning by a Specific Bit

Require: bit,f(x),g(x)

return(bit·f(x)+(enc(1)–bit)·g(x)))

The above manipulation is based on bit representation of the encrypted value, i.e., a vector representation of the data. This allows access to single bits, which offer greater flexibility in doing blind conditioning. Access to an encrypted bit allows blindly "figure" the bit value and act accordingly, at the cost of several multiplications and an addition of the argument built earlier. It is not possible to "see" the actual clear text bit value, but is possible to work on it and output a result dependent on it. The blind conditioning will be later extended to an even more elaborate technique that is also capable of implementing blind switch/case programming primitives (see Algorithm 4), rather than a single blind if (blinding is an encoded form for delegated computation without knowing either the real input or the real output).

At first glance it seems possible to repeat a computation encrypted with different keys, and find out whether the server is computing correctly. However, the server can be answering consistently wrong answers. The ability to send consistent output can be trivially demonstrated by a policy of the server in which the server uses the input as the output. Such a policy may be suspected by the computation delegator. The server may employ more sophisticated consistent wrong computations, such as, constantly adding (or constantly subtracting) as long as the operation is different from the requested computation, the input variables (in case the input consists of more than one operation).

The computation delegating party may have means to check the result. For example, checking the value of the least significant bit, to reflect the bit anticipated value. One may also occasionally compute the result to compare with the result the server sends, this still gives non-neglected probability for using hunchbacked wrong results, and in the scope of cloud computing does not necessarily reveal the malicious server [32]. Other self-testing self-correcting techniques [4, 33] can be used to verify the result. A malicious server may design and tailor a function that nullifies the benefits of (such) easy (easier than the actual calculation) attempts to check techniques.

The server can implement any function on the encrypted inputs and be consistent with the answers, repeating the same outputs to the same corresponding (before encryption) inputs, and also be tailored to be consistent across outputs.

The server can execute any (wrong) function, and still, possibly return consistent outputs across inputs, coping with self-testing/correcting checks, on any encrypted input, and output an encrypted answer for the chosen function. Given an encrypted input, the server produces an arbitrary encrypted (wrong) computation result of its choice. This result is encrypted with the same key used to encrypt the input, while the server has no access to the encryption (public) key itself.

To ensure that the choice of the wrong result is consistent with future queries with the same input, possibly encrypted by different key(s), the server may (explicitly or implicitly) construct in its memory a (clear-text) lookup table, mapping inputs to (specific wrong) outputs.

Every time an encrypted input data is received, the server employs a procedure to return an encrypted output with the unknown key used on the encrypted input, using its predefined lookup table, even without having the public key which was used for the encryption. Therefore, the server can save a particular and consistent result as clear text in its lookup table, resulting in the same selected operation for all future inputs, even if the encryption key is repeatedly changed.

The implication is that after selecting a defined output for every possible input data in its lookup table, the server can return consistently manipulated results on all future inputs.

Implementation Details

Figure 1:
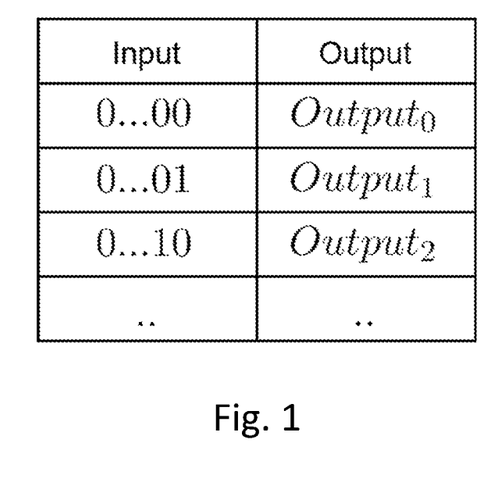
FIG. 1 shows a clear-text Look-Up-Table (LUT), used by a malicious server to return a certain output, according to the input.

It is assumed that a malicious server has only a single encrypted input data (which can be in fact a concatenation of several inputs), for which it wants to return a certain output, according to the input, described in its clear-text Look-Up-Table (LUT), shown in FIG. 1.

At the first step, it is shown how a malicious server obtains an encrypted value 1 when needed, for the use of setting the selected outputs from its plaintext LUT to an encrypted form, without having the public encryption key. The avoidance in supplying the public key limits the manipulation power of the server, but still allows any computation, as the delegator may supply upfront all needed encrypted values as part of the inputs.

The present invention uses solely FHE supported functions, multiplication and addition, to create a bitwise OR operation between two arbitrary encrypted values (bits). The implementation is based on the bitwise OR properties, which can be represented as $OR(x, y)=(x+y)-(x \cdot y)$. This means that an OR operator will be implemented as a procedure with a single addition, multiplication, and subtraction. This OR operator is used upon all the bits of the encrypted input iteratively, resulting in an encrypted value 1, unless all of the encrypted input bits are 0. Obtaining an encrypted 0 value is performed by simply subtracting any selected input bit by itself. The case in which the input data value is exactly 0 is addressed by the fact that when no encrypted 1 can be constructed, the output must be 0.

After having encrypted 1 and 0 values, the malicious server can use regular FHE operations to construct its desired encrypted output values by the received input, even without the public key.

It is also possible to flip specific bits in the encrypted input, by subtracting them from our constructed encrypted 1 value, using $flip(enc(bit))=enc(1)-enc(bit)$.

At the next step, a calculation that allows blindly finding the correct row is constructed, in terms of the received encrypted input, and return the desired encrypted output. This is made blindly by forming an argument returning a true (1) value that is dependent on the input, for each possible row in the LUT. For every row in the LUT, the argument will consist of multiplication of every bit, or negated (neg) bit of the input, in a way that the multiplications will equal 1 if and only if the input data matches the row input value. This makes the argument equal to 1 if and only if the input has the corresponding bits set to true or false according to the row input value, and to 0 otherwise. By multiplying the expected output at the end of the argument, the row value is set accordingly, if it was the correlated row input value. Thus, the output of the row is (blindly) obtained, if the inputs match the row and 0 otherwise.

For example, for the first 2 rows in the LUT, the following arguments are constructed:

$neg(bitn) \cdot \ldots \cdot neg(bit2) \cdot neg(bit1) \cdot neg(bit0) \cdot Output0$ $neg(bitn) \cdot \ldots \cdot neg(bit2) \cdot neg(bit1) \cdot bit0 \cdot Output1$ The last row will be set as follows:

$bitn \cdot \ldots \cdot bit2 \cdot bit1 \cdot bit0 \cdot Outputn$

After calculating the value of all the possible rows, the results are summed, where there are zeros for all the rows, except for at most one row, which represents the received encrypted input. The calculation of that row will result in the expected output that corresponds to the input.

This process does not break any of the FHE properties, and there is no possibility to read the encrypted input data as clear text. Constructing the blind (and computation heavy) argument allows to return a defined output for every possible input, using solely the encrypted input data from the delegator.

A basic example defined and implemented using HELib of an input range of three bits, where the output for each possible input (0-7) is set alternately to 0 and 1 can be found in [34].

Algorithm 2 Implementation of Bitwise OR Operator

Require: $x,y$

$return(x+y)-(x \cdot y)$

Algorithm 3 Implementation of the Bitwise NOT Operator

Require: value,enc(1)

$return(enc(1)-value)$

Algorithm 4 Use LUT L for an Encrypted Input x

Require: $x, LUT\ L, enc(1)$ negated=flip($x$,enc(1))

out[0]=negated$n \cdot \ldots \cdot$negated2$\cdot$negated1$\cdot$negated0$\cdot$output0 out[1]=negated$n \cdot \ldots \cdot$negated2$\cdot$negated1$\cdot x$0$\cdot$output1

...

out[$n$]=$xn \cdot \ldots \cdot x$2$\cdot x$1$\cdot x$0$\cdot$output$n$     for $i$=0 to $n$ do     result=result+out[$i$]

end for return result

Hence, a malicious server can arbitrarily manipulate the outputs in a consistent way across FHE values encrypted with different keys. Therefore, the computation primitives the server can use are restricted.

At the next step, several possible restrictions examined, particularly, restricting the computer to execute only the addition operation. The bit computation granularity and the binary addition in the process of inputs additions are still examined.

Fingerprints in Addition in Word Computation Granularity

Computation according to this scheme is traceable for verification purposes by adding (one or more) encrypted input control bits (called computation fingerprints) inside a single fully homomorphic encrypted number [8]. Subtraction is handled as the addition of negative values. The word granularity and SIMD solutions are designed to check the final result of the computation, without any significant additional overhead.

Arithmetic Circuit Representation

At the first step, proposed (word) schemes are designed using arithmetic circuits that represent polynomials (possibly over a certain finite field). Arithmetic circuits are defined as the multiplication or addition of two other variables or constants, and provide a formal way to represent the polynomial computing complexity. In the case of the addition of two polynomials, the resulted polynomial will have the same number of monomials, with component-wise addition. The multiplication of polynomials will result in a long number of single monomials, added to each other. This representation and specifically the multiplication composition increase (even exponentially) the size of the polynomial description. The size will be set within the scheme limitations, as it will result in a (large) number of separated monomials that are calculated by the addition of (also, logarithmic represented values for facilitating multiplications) values, and are added to each other.

Restricting to Black Box Additions

One of the basic operations in computation is the addition operation (arithmetic circuits are a combination of additions and multiplications). The server capabilities to manipulate the addition operation when the computation is executed over bit representation is examined. The ability to replace the carry bits that are computed in each bitwise operation by 0, will lead to the result of 00 when adding 01 to 01. The server can just ignore or set to zero any carry bit that arose from the addition operation, resulting in a wrong result. Therefore, the primitives of the server are further restricted to execute black box word granularity additions, where the server calls a function that returns the correct addition result, rather than involving a binary addition. Hence, a computation black box supporting environment is built, similar to the interpreter level (e.g., Java byte-code [35, 36]) or restricted operating system as Internet cafe (e.g., [37]).

The schemes proposes by the present invention can implement any arithmetic circuit computation, while providing trust for the correctness of the computed calculation.

Adversarial Capabilities of Black Box Addition Restricted Server

The operations of the (possibly malicious) server are restricted to execute black box word granularity additions, while the server is still able to deviate from performing exactly one addition of each of the inputs to be added. The black box restriction prevents the server from manipulating the encrypted inputs otherwise.

Binary Fingerprints

According to the present invention, computation (addition) fingerprints are added to ensure that the server has added the required variables, exactly once. Numbers that are composed of parts that fulfill two goals are used: the first goal is to compute the calculation request itself. The other part(s) are used for verifying (by the computation fingerprint) the computation that was made. All numbers will be segmented respectively, to support the correct addition of parts. The expected result of the fingerprint is known in advance and can be computed by the delegator. This The expected result can be reused/reconstructed over different inputs, even while working with different servers, since it is encrypted, and its exact position is unknown to any server. The final result from the server is verified, and deemed valid or not, based on the computed value of the computation fingerprint.

Figure 2:
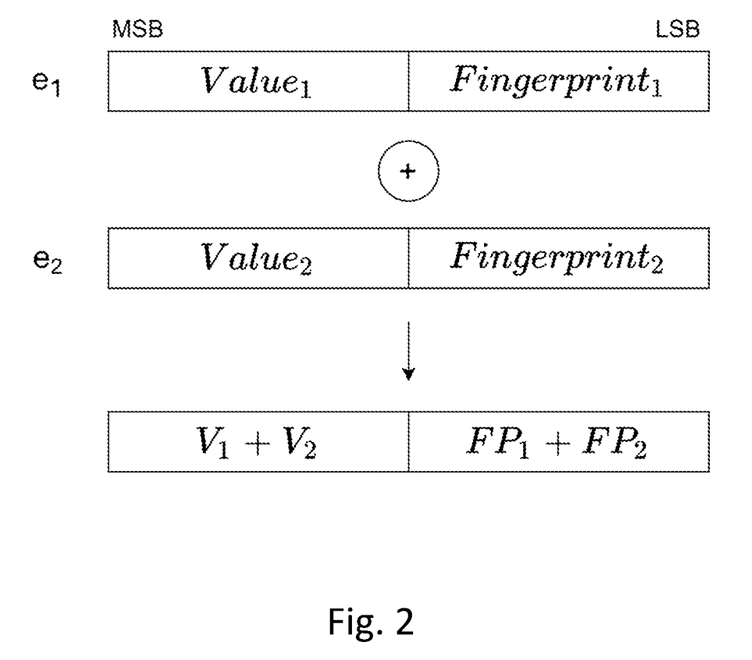
FIG. 2 shows an example of encrypted-to-encrypted addition, according to an embodiment of the invention.

For example, if there is a need to calculate 001+110, four computation fingerprint bits are added in the tail of 001 and 110 to have, e.g., 0010010 and 1100100, followed by check whether the result ends with 0110 prior to accepting the 111 of the three most significant bits as the correct result. The choice of having the binary fingerprints to be located as the least significant bits is motivated by the automatic overflow processing of the actual calculation part, so as to avoid a mix between the fingerprints and the actual calculation portion. This is the motivation to choose the portion of the computation fingerprint to reside in the least significant part, as the delegator selects the values comprising the input data and accordingly, knows the expected result of the fingerprint. The malicious server may use fingerprint overflow to ruin the result while keeping the fingerprint correctness. The server can add an added $2m+1$, where m is the number of fingerprint bits. Thus, the proposed addition black box is designed to set the result of addition to zero if there is an overflow from the fingerprint part. FIG. 2 shows an example of encrypted-to-encrypted addition.

Fingerprint Manipulation

If all inputs are added up at most once and at least one input is added less than once, a wrong (missing) fingerprint will be detected in the result. Alternatively, the server may choose to add an input several times, to create the computation fingerprint in a different manner. Each input is kept with a single fingerprint bit in a location different than any other addend. This is done to prevent overflows from the fingerprint portion through to the calculation portion when the computation is correct. An adversary can try to guess the locations of the fingerprints and create fake fingerprints by adding an encrypted input more than once, without necessarily triggering an overflow from the fingerprint portion.

If the server knows, or correctly guesses (as the input is encrypted), that there is an encrypted input x=Enc (0000001), then a (malicious) server can produce any fingerprint by adding x to itself, for example, y=x+x=Enc (0000010), and z=y+y=Enc(0000100). Moreover, the (malicious) server can add y+z to obtain the combination Enc(0000110) of fingerprints.

The (malicious) server may add all addends but one, x, and try to create the missing fingerprint of the excluded addend by using the fingerprint of another addend y. The server may succeed in creating the missing fingerprint if the fingerprint of y is smaller than the fingerprint of x. For this, there is a probability of 0.5 to guess correctly. Also, the probability of a correctly guessing the right number of bits d that separate the fingerprint of x from the fingerprint of y is $1/(m-1)$, where m is the number of bits used for the fingerprints. If the guesses are right, which occurs with probability $1/(2m-2)$, then adding y $2^d$ times to the sum that exclude dx will mask the absence of x.

Complete Fingerprints

While defining binary fingerprints and surveying the possibilities to manipulate them, each input is maintained as a single fingerprint bit, in a unique location. It is also required that the fingerprint bit length will correlate to the number of addends used, for maintaining the previous rule that a single, uniquely located fingerprint bit will be used per input, so that the complete addition of inputs will result in a 1 . . . 11 fingerprint. The influence of even a single redundant addition will be a definite overflow of the fingerprint.

Even though complete fingerprints allow the evident indication of excessive additions (as adding all inputs and any of the inputs more than once will create a fingerprint value different than 1, . . . , 11) still, a weakness exists, as described below.

Fingerprint Overflowing

In addition to the above adversary possibilities, an adversary can also create a calculation result with the expected fingerprint, while still producing a wrong calculation output.

Assuming that the fingerprint value resides in the least significant part of the input, the adversary can add an input to itself 2m times to clear out the fingerprint (m is the number of fingerprint bits), while changing the computation value, where an extra addition of the same input data will result in the inputs original fingerprint, with a different (corrupted) calculation section. The use of this corrupted input in the requested calculation by the server will create an output with the expected fingerprint value, and an arbitrary wrong calculation result.

Using complete fingerprints, an overflow will be immediately identified by the most significant bit in the fingerprint section. This bit can be used with the previously constructed bitwise NOT operator (as described in algorithm 3), calculated on the overflow indicating bit, when at least one of the bits is (encrypted) 1 (when all are zeros, the fingerprint stays zero, which enables detection), multiplied by the given result. If no overflow occurred, this will result in the multiplication of the result by 1, which will not change it. This defines the final black box configuration, allowing only addition with no overflow-carry operations.

Fingerprint Carry Detection

In the complete fingerprint scenario, since all inputs have a unique fingerprint bit location, no carry operation in the fingerprint section while adding is required. This implies that any carry operation indicates an unintended (malicious) behavior. This behavior might represent an attempt to compensate for a missing input data and will influence the black box definition, so it nullifies the result when a carry operation, in the relevant section, is detected.

The black box is implemented using the OR and NOT bitwise operators (algorithms 2, 3), where the black box will OR all the carries that resulted in the fingerprint section, negate this result, and multiply it by the addition result to zero the final output when an undesired carry takes place. In the completing case, where no carries were made, the OR operation will result in a 0, then negated to 1, which will not change or impact the output. For doing so, the black box should be aware of the length m of the fingerprint section, and should be specifically built for that fingerprint length. Hence, every input, whether it is the same value or not, is regarded independently and is associated with a unique fingerprint.

Capabilities Bound of a Restricted Adversarial

The restrictions applied by scheme proposed by the present invention result in a tight bound on the adversarial capabilities, using the addition no overflow-carry black box. In a simple deficient case, a single missing addend will be easily detected in the resultant fingerprint. The opposite behavior is the excessive addition of inputs, where a single extra addition will cause a definite overflow in the complete fingerprints scheme, which will nullify the whole result. The completing case for all of the above, addressed using the carry detection, will strictly nullify the addition result when any different than intended inputs are added. A scenario where the received input equals 0, is managed by using a blind if, and returning the same (0) output. The encryption keys are changed in every different, request from, or use of, the server. This sets a tight bound on the adversarial capabilities, and hence, the following lemma can be stated:

Lemma 1: For every group of FHE input of bits, having m least significant bits used as complete fingerprints, and the other n bits used for computation, operated on by the addition no overflow-carry black box defined earlier, will result in the correct addition of the computation values and a complete fingerprint, or the value 0. The proof of Lemma 1 follows from the definition of the addition no overflow-carry black box. Let the FHE values Input1, Input2, ... Input i, following our scheme, having complete fingerprint values, operate in the mentioned black box. Execution of the black box for any of the same inputs will result in a carry, which will be immediately nullified. Omitting a certain input data from the calculation will result in a not complete fingerprint, and an attempt to compensate for it will involve the carry operation, which will nullify the result in such an event. Note that even if the fingerprint overflowing vulnerability surveyed earlier was not mitigated by the carry detection mechanism, it will be explicitly nullified at any fingerprint overflow.

Integer Fingerprints

In integer fingerprints, a random number k, larger than one (as 0/1 values are the identity values for addition/multiplication) is chosen uniformly from the range 1 to $2m-1$, such that if the addition operation consists of i addends, then the number of overflow bits can be log(i) and thus, $k+\log(i)$ must be less than or equal to 2m (m is the number of fingerprint bits). This new scheme changes the fingerprint value after each addition by more than a single bit, contrary to the proposed binary fingerprints. This prevents from nullifying fingerprint carry operations (as it is now needed), yet adds more possibilities for a potential attacker, and reduces its probability to guess the right fingerprint to $\frac{1}{2}k$. This still requires taking into account potential overflows, since the adversary can cause an overflow by adding an input more than once. To overcome this problem, the same overflowing mitigation (described above) is required. The bootstrap of an integer fingerprint requires computation, i.e., addition of the first fingerprint (for the needed number of addends). Then, the result of the calculations (when no overflow is possible, as enough leading bit values are 0) may serve as future fingerprint values, based on the correction of the first computed fingerprints yielding the correction of the following computations in a transitive manner.

Different Inputs Subset Probability

Integer fingerprints substantially expand the range of possible fingerprint values after each addition. Yet, they might be maliciously used in a new manner.

The verification process proposed by the present invention may be represented as a variant of the subset sum problem. The set Z of i positive integers are the fingerprints in each of the input values, and the target value t is the expected fingerprint result 2k. The original problem slightly varies, since the values (inputs) can be repeated. The arithmetic circuit (polynomial) which was requested to be calculated represents the intended subset that achieves the target value, but yet, there might be other subsets that result in the same target. The subset sum problem was recently proved to be solved in pseudo-polynomial time of $O(t+i)$. Despite that, the scheme proposed by the present invention has a major difference, since the values used are encrypted, making the problem much more complex. Also, in the average case (the blind subset sum problem), the server does not know the actual values of its inputs, nor the target value. This leads to the conclusion that for a calculation with i addends, and a target value 2k, any value of the k least significant bits of m have a uniform probability to be chosen and the sum (mod 2k) has also uniform probability in the range of 0 to $2k-1$. Thus, the probability of using a (repeated) subset to gain the needed result is less than $\frac{1}{2}k$.

Multiplication by a Constant

Figure 3:
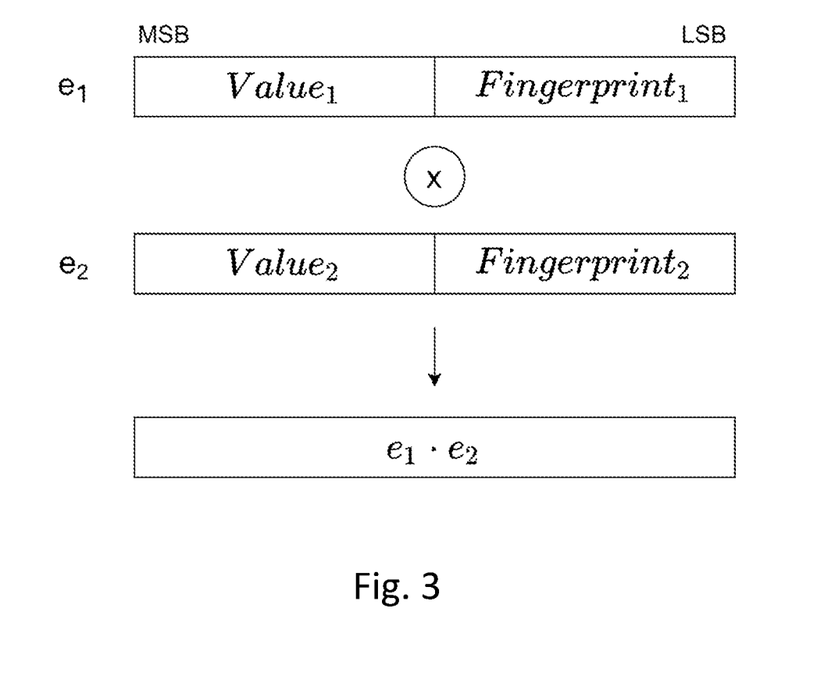
FIG. 3 illustrates an example of encrypted numbers multiplication, according to an embodiment of the invention.

In case of multiplication by a non-encrypted constant, the multiplication can be considered as a shortcut of listing certain inputs several times as addends. More general multiplication can combine the fingerprint part with the actual computation variable, and therefore, discrete logarithm representation is used, as described below. A multiplication example is illustrated in FIG. 3.

The multiplication complexity occurs due to the influence of the bits in both parts in an unexpected manner in the same or completing parts, and their mutual dependency on each other in the encrypted number. This combination of bits prevents from accounting for it in the operations, thereby preventing any option to compensate for it in the fingerprint.

The loss of the multiplication operation on encrypted numbers limits and produces a weaker scheme and prevents it from fully implementing arithmetic circuits, which are composites of both additions and multiplications.

Multiplication Via Logarithms in Word Representation

The present invention also provides addition techniques to verify multiplications, while using discrete logarithmic representation with fingerprints as inputs.

The goal is to delegate the complete computation of an arithmetic circuit, which requires verification of both additions and multiplications. One possibility is to regard an arithmetic circuit as a polynomial, multiplying to compute monomials, and adding the results of the monomials to a complete the polynomial computation.

As a first possibility, the computing server may use LUT to convert the inputs to discrete logarithmic values and to exponentiate the result back before adding. Then, these tasks may be delegated to a server/hardware/device (e.g., enclaved), or to further enforce that the server computes first multiplications and then, use a function that exponentiates the result. This preserves the encryption and the fingerprints of the inputs, by adding an encrypted counter, will be detailed below.

Adversarial Capabilities

The multiplication process is divided into two phases, the logarithmic addition of values, and the exponentiation of the result. The logarithmic addition was evaluated in the fingerprint manipulation section, in terms of adversarial capabilities. The LUT phase involves using an encrypted result for each possible logarithmic addition outcome. The options open to an adversary with an encrypted LUT are limited, where an adversary can only change the order or the amount of LUT operations on the input(s). This means that any atomic use of the LUT cannot be interfered with, but can be repeatedly abused. Any input other than the intended one, used by the LUT, will result in a wrong fingerprint output being sent to the delegator, or will be wrongly propagated during following operations. The absence of exponentiation will result in a wrong (missing) fingerprint by the server. Any manipulation on the (encrypted) fingerprints values will have the same adversarial probabilities considered in the fingerprint manipulation section.

Discrete Logarithmic Representation

To imitate multiplication between encrypted numbers, logarithmic addition is used, which is based on the equation $\log(x \cdot y) = \log(x) + \log(y)$. The solution will be set by the delegator, which is completely transparent to the server. Instead of requesting multiplication of values, the delegator will send the (encrypted) logarithmic representation of the values which are protected with fingerprints, to the server. This allows the server computing additions of log values, which are sent to the delegator as a result to be verified against the fingerprints and then to be exponentiated. For example, a basic case of computing 4·8, will be represented as 2+3 in the log 2 field by the delegator. The computation of this addition by the server according to the proposed scheme, will result in the value 5, where the delegator will calculate the result of 25 by itself, and achieve the value 32, which is the original result of the requested multiplication 4·8.

By using logarithmic addition, it is possible to mimic multiplication. This requires the delegator to calculate the logarithmic representation of the values, possibly by using LUT or caching the already computed logarithms for later reuse.

For example, in the function $F(x, y) = (2 \cdot x) + y + 3$ (all constants are encrypted), the calculation of the addition of constants will influence differently than intended, as those values should be reduced to represent their correct significance in the new field. This restricts the complexity of addition and multiplications calculations of individual factors, and form a calculation characterized by a long addition of many monomials. Also, not all log values will result in a round value, restricting to the use of a floating-point FHE scheme, while introducing rounding errors, where it is possible to operate on integers only in additions.

Logarithmic Lookup Table

A possible way to overcome the dependency on the delegator is to exponentiate logarithmic represented values by a black box procedure for exponentiation, while keeping the original fingerprint and adding fingerprints for counting the number of exponentiated results that were added.

Figure 4:
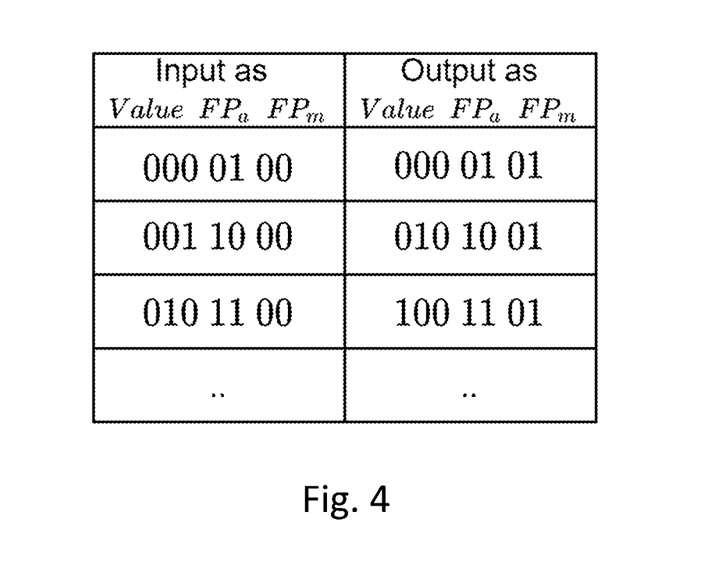
FIG. 4 illustrates an example of an exponentiation lookup table, according to an embodiment of the invention.

This means that along with the ordinary fingerprints for additions (F Pa) which were explained earlier, there will be other (multiplication) fingerprint bits (F Pm) assigned to track and verify the number of LUT uses made by the server, in the same manner binary fingerprints were used to verify the execution of the addition operator on the input(s). The new fingerprint serves as an indication to avoid the possibility that the server adds the logarithmic representation with their fingerprints, rather than enforcing the exponentiation with fingerprints. An example of exponentiation lookup table is illustrated in FIG. 4.

Going back to the previous example of 4·8, the server will now calculate 2+3, resulting in 5, which is represented as 000101. The fingerprint is of equal size of six bits, e.g., 011000. For readability, the computation and fingerprint parts are separate by a space. The delegator will set a row in the LUT, for the input of 000101 011000, the result of 100000 011001. This result is composed of the calculation result 100000 (32) and the fingerprint 011001. The fingerprint was changed from the original 011000, where the LSB was turned on. This bit is used to indicate in the final result received from the server that this specific exponentiation operation was indeed applied in the calculation process, as the fingerprint was changed accordingly. This solution makes the server independent from the delegator, and allows the server to continue calculating without interruptions, with a computational cost of using the LUT when switching from multiplication to additions. For example, the polynomial (that represents an arithmetic circuit), say, $F(x, y) = 2 \cdot (x \cdot y + 32)$ for x=4, y=8 is calculated.

Following the previous example, the fingerprint and calculation parts are expanded to eight bits. The requested 4·8, was changed by log 2 to 2+3, resulting in 00000101 00011000.

Using the exponentiation LUT, the value was changed to 00100000 00011001, containing the requested value of 32 (00100000), with the fingerprint value of 00011001.

Figure 5:
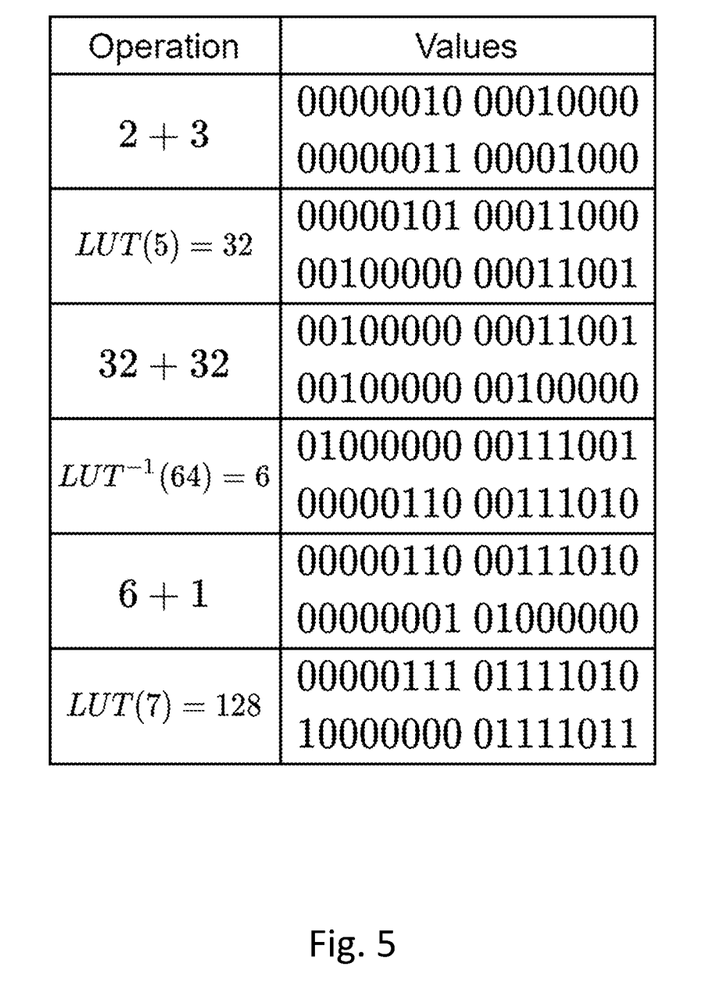
FIG. 5 illustrates an example of a complete calculation process where the fingerprint value compared and verified when acquired by the delegator, according to an embodiment of the invention.

The next operation is an addition of 32, having the fingerprint value of 00100000. This sum is represented as 01000000 00111001. Next, multiplication by 2 is requested, which is represented as the addition of the value 1. Adding the value 1 will obligate transforming 64 to 6 by the same log 2, while retaining the fingerprint value. This will be achieved by using another LUT, changing the value 01000000 00111001 to 00000110 00111010, where the counting fingerprint value was increased by 1. Finally, the value 1 with its fingerprint 01000000 is added to result 00000111 01111010. By using the exponentiation LUT again, the computation part (which equals 7) is changed to 128, and the fingerprint is increased by 1. This yields the final output of 10000000 01111011. The fingerprint value is known and consistent for the selected fingerprint values, and will be compared and verified when acquired by the delegator. The complete calculation process is shown in FIG. 5.

Lemma 2: For every group of FHE inputs, each having m least significant bits with addition and multiplication (counting) fingerprints (F Pa, F Pm), and the other n bits used for computation, operated with the addition no overflow-carry black box and the exponentiation LUT defined earlier, will result in the correct calculation of the computation and fingerprint parts, or the value 0.

Proof: By Lemma 1 the logarithmic addition is correct or set to zero prior to the exponentiations using the LUT. In case the server adds the results of the logarithmic addition and outputs the result without using the LUT, detection of the missing counter in F Pm occurs. As the multiplication fingerprints F Pm reside in the least significant bit part of the fingerprint section itself, even the bounded carry attack attempt using the addition fingerprints will not assist the adversary, since the carry bits could only overflow to the computation part. Any overflow from the computation part effecting the fingerprint section, will also nullify the output. The LUT operations, defined by the delegator, will include all possible monomial and fingerprint values, and will be set to change the F Pm values in a distinct manner.

Integration and Implementation in Word Granularity

Multiplications (in a logarithmic representation) exponentiation while preserving computation fingerprints, and operating additions, black box operations that enforce the ordered operations may be applied. It is possible to use different isolated server/device/hardware restricted to execute only one portion in the above sequence of operation and send the results to the next entity to operate the next operation, as required. A separated enclave may be used as such computation hardware.

The above description discusses limitation that could be enforced by executing different black boxes, as enclaves. The "Intel SGX" is capable of creating the mentioned enclave, by running encrypted code made for a specific program, where the execution of this code is inaccessible for other external processes or entities to interfere. Thus, it will allow enforcing the use of additions exclusively, thereby eliminating the possibility of any unexpected behavior.

Using Existing Software Libraries

For example, Microsoft SEAL library (C#) has been used, where the following function $F(x, y)=(2 \cdot x)+y+3$ has been calculated, with all the constants in their encrypted form. Allocating 6 bits as the size of each part, (3,2) were selected as the predefined fingerprint values, where $F(3, 2)=11$. The fingerprint part was selected as the right (LSB) side, since this choice does not cause overflows. The computation values, generally selected by the computation delegator for its own use, in this example equal to (4, 7), where $F(4, 7)=18$.

The addition of constant values has been implemented as basic additions, along with the requirement of receiving the added value in a doubled form. Hence, for the addition of the constant 3, the value is received with its shifted counterpart, so the addition will be of a number constructed as 3, added to the bitwise logically left shifted (indicated as LSH) by 6 bits counterpart of it, $LSH6(3)=192$, where the same was also set for subtraction. The constant multiplication was made as regular multiplication of the constant encrypted value. The input values were LSH6 each, where each result was appended to the requested fingerprint values, (3, 2) in this example.

The constructed input was set as $x=LSH6(4)+3=259$, $y=LSH6(7)+2=450$. After calculating F in the form described above, the clear text result was decrypted as 1163, the least significant part of which containing the fingerprint value, is extracted using bitwise left and right logical shifting (LSH, RSH), by calculating $RSH6(LSH6(1163))=11$. Extracting the computation value from the most significant part was by $RSH6(1163)=18$. Verifying that $RSH6(LSH6 (1163))$ equals the expected fingerprint value of 11 confirms the calculation, while stating that the calculation was verified to have been calculated correctly and that $F(4, 7)=18$. Out of 3 required additions/subtractions in the original function F, the same 3 operations were made, while keeping also the original single multiplication as is. The extra addition operations made to the constant values should be computed just once per function definition, and could be reused later and on different input values or servers. This means that the calculation of $(LSH6(3)+3)$ is independent of the (other) input values, and could be calculated offline and used for all further calculations. The source code of this example can be found in [34].

Supported Libraries

The main tested libraries were Microsoft SEAL and IBM HELib (Homomorphic Encryption library—a free and open-source cross platform software developed by IBM that implements various forms of homomorphic encryption) [30], both used the BGV/BFV and CKKS schemes. Both of those libraries support C++ and work on Linux (Ubuntu—is a Linux distribution based on Debian and composed mostly of free and open-source software), where Microsoft SEAL (open-source homomorphic encryption technology which provides a set of encryption libraries that allow computations to be performed directly on encrypted data) also works on Windows OS with C# support. The CKKS scheme supports floating-point operations. The libraries were chosen for their popularity and accessibility, where each of them supports FHE with addition and multiplication. HELib also focuses on making SIMD operations much faster than previous libraries [30], allowing to work with vectors of encrypted data, and apply a selected operation on all of the vector elements.

Encrypted Number Representation

While working on encrypted vector (bit) representation of the data, not all schemes have (encrypted) bit access, and on some of the FHE schemes there is an encrypted integer number representation. Working with regular FH encrypted numbers involves much more computations, compared to the vector representation of the data.

The computation complexity of blind conditioning on vector-based variables allowing specific bit access with w bits, can be represented as a calculation for each of the two possible values of a bit.

This will be made for all the bits separately, thus, resulting in a complexity of $O(w)$. On the other hand, with regular FHE numbers (without bit access), the blind conditioning will depend on all of the bit values of the input, combined. This means that there will be a condition for every possible value of the number as a whole, representing a $O(2w)$ complexity, where w is the total number of bits in the input. Therefore, both of the representations are referred to as equivalent in a qualitative (rather than quantitative) manner, as they have the same output capabilities.

Fields

While limiting the number of operations possible to eliminate the chance of overflowing each of the part limits, the verification layer may be reinitialized using modulo and finite fields. This can be implemented in a simple form by providing the modulo value as an encrypted number from the delegator, to be used by the server, to subtract any whole multiplication of the field. An overflow can be detected using a blind if (algorithm 1) on a bit indicating it and the subtracted result will be used for further calculation. The provided encrypted value from the delegator can also possibly include a module value to be subtracted from the fingerprint part. Yet, the two parts are not dependent, and the fingerprint section can be set to not be affected by the subtraction.

Lemma 3: Any calculation of an arithmetic circuit, representing a polynomial, having FHE inputs that are infused with computation fingerprints following the proposed scheme, can be successfully verified by the delegator.

Proof: By Lemma 1 and Lemma 2, the addition and multiplication of encrypted values, infused with fingerprints, will result in the correct calculation of the computation and fingerprint parts, or the value 0. Any polynomial is the addition of monomials, where each monomial is the multiplication of values. Thus, it is possible to represent and calculate any polynomial by the proposed scheme. Therefore, it is possible to calculate any arithmetic circuit. Receiving the expected fingerprint value will verify the correct execution of the arithmetic circuit, and any different fingerprint result will deem otherwise.

Restrictive SIMD as a Vector with Fingerprints

It is possible to incorporate the computational fingerprint into SIMD manipulated data structures, such as vectors. Starting with vectors of integer elements, it is possible to proceed to vectors with only fingerprint integer values, thereby enabling floating point arithmetic for the delegator.

Floating Point Operation on Data in SIMD

The primary FHE floating point scheme is the CKKS [23], which works by encoding a vector of plaintext values to a polynomial. Each coefficient of the polynomial is originated from the corresponding vector element, which is projected to a different field, and then multiplied by a scaling factor to control the rounding error of the floating point number. This polynomial is defined by treating the vector values as the image for a selected set of roots, where the degree of the resulted polynomial will equal the vector length. In addition, there is a technique called rescaling, that consistently maintains the decryption structure small enough compared to the cipher text modulus, as a kind of modulus switch operation [12].

The rescaling operation reduces the size of the cipher text modulus, while maintaining a valid encryption and almost preserving the precision of the plaintext, using primes selected as part of the encryption parameters, so at each rescaling execution the cipher text modulo is divided by one of the chosen primes. As in modulus switching, the number of primes limits the amount of possible rescaling operations, and thus limits the possible depth (level) of the computation. This limit will allow restricting overflow attempts caused by redundant SIMD operations. FHE operations are obtained by manipulating each monomial of the polynomial accordingly. This succinct polynomial representation is well suited for SIMD calculations, where each operation will be acted upon in the same manner, on all polynomial coefficients. Still, each entry of the SIMD vector may be regarded as a totally independent value.

Adversarial Capabilities in SIMD Environment

Although instructed otherwise, the adversary can compute a different arithmetic circuit (or general computation, which is not necessarily defined in a finite field) than the one the delegator instructs the server to use. Still, the server is bounded to perform the exact same sequence of operations on each entry of the data vector, and cannot execute different programs for each such entry. Moreover, there is isolation between vector entries, with no mutual influence.

The vector components, both fingerprint and computation elements, are restricted to integers, as using floating point may result in rounding errors, possibly nullifying the effect of (very) small fingerprint numbers not in the scale of (much) larger numbers when they are added to each other. This will result in approximating the small number to 0 (see e.g., [40]).

Integers in SIMD

Using the floating point CKKS scheme described earlier, it is possible to manipulate vectors containing different elements in an efficient SIMD manner. The integer fingerprints scheme is adapted to comply with this new state, where separate elements reside in a vector. As in the basic integer fingerprints scheme, the fingerprint element, manipulated by the requested arithmetic circuit from the delegator, will result in a value the delegator can better verify.

By limiting the proposed scheme to work with only integer elements, divisions are also restricted, as this impairs any possibility of creating floating point values while executing a calculation. Any overflow of the vector will affect all of its elements in the same manner, without mutual influence between different elements. This means that overflows might just create new (overflowed) values or return the vector to its original state. In this proposed scheme, a black box that identifies and acts upon overflows is not required. Using integers in SIMD allows skipping the log representation conversion (using the LUT) described above for the word granularity case, thereby making the proposed scheme even more efficient. In addition, for the same arithmetic circuit, it is possible to verify multiply isolated inputs in a vector, using a single fingerprint value in it.

Fingerprints in Floating Point Vectors

Even though SIMD supports floating point variables and operations, the fingerprints are restricted to integer and to avoid divisions and subtractions altogether. Additionally, adding any constant floating point values to the input is avoided, thereby those also affect the fingerprint element. The reasons for restricting the fingerprints to be integer are related to the special rounding operations applied in the scope of float representations. Floating point values are allowed to be used as the computation elements.

Avoiding divisions and subtractions includes limiting all fingerprint values to be a positive integer (greater than 1, as discussed above), to prohibit subtraction by an addition of negative values, or division as the multiplication of fractures.

In order to avoid divisions and subtractions, it is possible take for example, a floating point computation element with a value of 0.0001, added to a 10000000000000.0 and then immediately subtracted by the same 10000000000000.0. The addition and subtraction of the floating point element may be approximated to 0. Yet, the corresponding integer fingerprint elements that may be, e.g., 7 and 4, will return to the original value of 7, which makes the floating point rounding invisible to the verifying delegator. Thus, one might verify a wrong computation result as the right result.

Even if only integers are used as fingerprints, changing the ordering of operation, might be used to maliciously create the correct fingerprint result. The possibility of this manipulation will be thoroughly discussed in the following description.

An implementation example of calculating the polynomial F $(x, y)=(((2 \cdot x)+1.5) \cdot (y \cdot 3))+0.1$, with SIMD manipulation of a vector containing integer fingerprint element and floating point computational values, using Microsoft SEAL, can be found in [34].

Computation Fingerprint Circuit

One may also want to trace the order of operations made (e.g., first adding small numbers to be non-negligible before adding them to a very large number, a serial addition of each one of them to the big number results in an approximation to 0). It is possible to extend the tracing by having the black box produce (possibly during the computation or as a final result) a symbolic (with or without FHE known computed values) representation of the computation steps, in a form of an arithmetic circuit. Theorem 6.1: Under the surveyed restrictions, computation fingerprint circuit verifies the correctness of the computation made in SIMD.

The SIMD [41] optimization that FHE libraries provide allows performing an individual computation, like addition or multiplication, on a vector of encrypted elements. This optimization provides a substantial advantage over the word granularity FHE schemes, since the fingerprint method may be extended to the case of non-integer values, including floating point calculations (the fingerprint can still be restricted to integers, but the actual variables can be also beyond integers).

Verifiable computing may be used on almost any of the many FHE applications, as Homomorphic encryption in its essence is oriented toward delegating data to be operated in untrusted environments [42], thus, there is great benefit in verifying and providing assurance for these type of computations.

The above examples and description have of course been provided only for the purpose of illustrations, and are not intended to limit the invention in any way. As will be appreciated by the skilled person, the invention can be carried out in a great variety of ways, employing more than one technique from those described above, all without exceeding the scope of the invention.

REFERENCES

[1] Saikrishna Badrinarayanan, Yael Tauman Kalai, Dakshita Khurana, Amit Sahai, and Daniel Wichs. Non-interactive delegation for low-space non-deterministic computation. In Electronic Colloquium on Computational Complexity (ECCC), volume 25, page 9, 2018.

[2] Joe Kilian. A note on efficient zero-knowledge proofs and arguments. In Proceedings of the twenty-fourth annual ACM symposium on Theory of computing, pages 723-732, 1992.

[3] Silvio Micali. Cs proofs. In Proceedings 35th Annual Symposium on Foundations of Computer Science, pages 436-453. IEEE, 1994.

[4] Shlomi Dolev, Sergey Lazarevich Frenkel, and Dan E Tamir. Probabilistic methods for self-correcting hardware design. 7(4):140-147, 2013.

[5] Shafi Goldwasser, Yael Tauman Kalai, and Guy N Rothblum. Delegating computation: interactive proofs for muggles. Journal of the ACM (JACM), 62(4):1-64, 2015.

[6] Oded Goldreich, SilvioMicali, andAviWigderson. Proofsthatyieldnothingbuttheirvalidityor alllanguages innp have zero-knowledge proof systems. Journal of the ACM (JACM), 38(3):690-728, 1991.

[7] Nir Bitansky, Ran Canetti, Alessandro Chiesa, Shafi Goldwasser, Huijia Lin, Aviad Rubinstein, and Eran Tromer. The hunting of the snark, Journal of Cryptology, 30(4):989-1066, 2017.

[8] CraigGentry. Fully homomorphic encryption using ideal lattices. In Proceedings of the forty-first annual ACM symposium on Theory of computing, pages 169-178, 2009.

[9] Ronald L Rivest, Len Adleman, Michael L Dertouzos, et al. On data banks and privacy homomorphisms. Foundations of secure computation, 4(11):169-180, 1978.

[10] Joppe W Bos, Kristin Lauter, Jake Loftus, and Michael Naehrig. Improved security for a ring-based fully homomorphic encryption scheme. In IMA International Conference on Cryptography and Coding, pages 45-64. Springer, 2013.

[11] Zvika Brakerski. Fully homomorphic encryption without modulus switching from classical gapsvp. In Annual Cryptology Conference, pages 868-886. Springer, 2012.

[12] Zvika Brakerski, Craig Gentry, and Vinod Vaikuntanathan. (leveled) fully homomorphic encryption without bootstrapping. ACM Transactions on Computation Theory (TOCT), 6(3):1-36, 2014.

[13] Zvika Brakerski and Vinod Vaikuntanathan. Efficient fully homomorphic encryption from (standard) lwe. SIAM Journal on Computing, 43(2):831-871, 2014.

[14] Zvika Brakerski and Vinod Vaikuntanathan. Fully homomorphic encryption from ring-lwe and security for key dependent messages. In Annual cryptology conference, pages 505-524. Springer, 2011.

[15] Jung Hee Cheon and Damien Stehlé. Fully homomophic encryption over the integers revisited. In Annual International Conference on the Theory and Applications of Cryptographic Techniques, pages 513-536. Springer, 2015.

[16] Jean-Sébastien Coron, Tancrède Lepoint, and Mehdi Tibouchi. Scale-invariant fully homomorphic encryption over the integers. In International Workshop on Public Key Cryptography, pages 311-328. Springer, 2014.

[17] Marten Van Dijk, Craig Gentry, Shai Halevi, and Vinod Vaikuntanathan. Fully homomorphic encryptionovertheintegers. InAnnual International Conference on the Theory and Applications of Cryptographic Techniques, pages 24-43. Springer, 2010.

[18] Yarkin Doröz, Yin Hu, and Berk Sunar. Homomorphic aes evaluation using the modified ltv scheme. Designs, Codes and Cryptography, 80(2):333-358, 2016.

[19] Léo Ducas and Daniele Micciancio. Fhew: bootstrapping homomorphic encryption in less than a second. In Annual International Conference on the Theory and Applications of Cryptographic Techniques, pages 617-640. Springer, 2015.

[20] Craig Gentry, Shai Halevi, and Nigel P Smart. Homomorphic evaluation of the aes circuit. In Annual Cryptology Conference, pages 850-867. Springer, 2012.

[21] Craig Gentry, Amit Sahai, and Brent Waters. Homomorphic encryption from learning with errors: Conceptually-simpler, asymptotically-faster, attribute-based. InAnnual Cryptology Conference, pages 75-92. Springer, 2013.

[22] Adriana López-Alt, Eran Tromer, and Vinod Vaikuntanathan. On-the-fly multiparty computation on the cloud via multikey fully homomorphic encryption. In Proceedings of the forty-fourth annual ACM symposium on Theory of computing, pages 1219-1234, 2012.

[23] Jung Hee Cheon, Andrey Kim, Miran Kim, and Yongsoo Song. Homomorphic encryption for arithmetic of approximate numbers. In International Conference on the Theory and Application of Cryptology and Information Security, pages 409-437. Springer, 2017.

[24] Jung Hee Cheon, Miran Kim, and Kristin Lauter. Homomorphic computation of edit distance. In International Conference on Financial Cryptography and Data Security, pages 194-212. Springer, 2015.

[25] Miran Kim, Yongsoo Song, and Jung Hee Cheon. Secure searching of biomarkers through hybrid homomorphic encryption scheme. BMC medical genomics, 10(2):42, 2017.

[26] Kristin Lauter, Adriana Lopez-Alt, and Michael Naehrig. Private computation on encrypted genomic data. In International Conference on Cryptology and Information Security in Latin America, pages 3-27. Springer, 2014.

[27] Michael Naehrig, Kristin Lauter, and Vinod Vaikuntanathan. Can homomorphic encryption be practical? In Proceedings of the 3rd ACM workshop on Cloud computing security workshop, pages 113-124, 2011.

[28] Shuang Wang, Yuchen Zhang, Wenrui Dai, Kristin Lauter, Miran Kim, Yuzhe Tang, Hongkai Xiong, and Xiaoqian Jiang. Healer: homomorphic computation of exact logistic regression for secure rare disease variants analysis in gwas. Bioinformatics, 32(2):211-218, 2016.

[29] Microsoft SEAL (release 3.5). https://github.com/Microsoft/SEAL, April 2020. Microsoft Research, Redmond, WA.

[30] Shai Halevi and Victor Shoup. Algorithms in helib. In Annual Cryptology Conference, pages 554-571. Springer, 2014.

[31] Leslie Lamport, Robert Shostak, and Marshall Pease. The byzantine generals problem. In Concurrency: the Works of Leslie Lamport, pages 203-226. 2019.

[32] Amitay Shaer, Shlomi Dolev, Silvia Bonomi, Michel Raynal, and Roberto Baldoni. B ee's strategy a gainst b yzantines replacing byzantine participants. In International Symposium onStabilizing, Safety, and Security of Distributed Systems, pages 139-153. Springer, 2018.

[33] Manuel Blum, Michael Luby, and Ronitt Rubinfeld. Self-testing/correcting with applications to numerical problems. Journal of computer and system sciences, 47(3):549-595, 1993.

[34] Github code repository, https://github.com/seniakalma/VC-FHE, February 2021.

[35] Bill Venners. The java virtual machine. Java and the Java virtual machine: definition, verification, validation, 1998.

[36] James Gosling, Bill Joy, Guy Steele, and Gilad Bracha. The Java language specification. Addison-Wesley Professional, 2000.

[37] Scott Alan Isaacson. Techniques for internet cafe service provider access, Nov. 5, 2009. U.S. patent application Ser. No. 12/112,098.

[38] Karl Bringmann. A near-linear pseudo polynomial time algorithm for subset sum. In Proceedings of the Twenty-Eighth Annual ACM-SIAM Symposium on Discrete Algorithms, pages 1073-1084. SIAM, 2017.

[39] Victor Costan and Srinivas Devadas. Intel sgx explained. IACR Cryptol. ePrint Arch., 2016(86):1-118, 2016.

[40] David Goldberg. What every computer scientist should know about floating-point arithmetic. ACM Computing Surveys (CSUR), 23(1):5-48, 1991.

[41] Nigel P Smart and Frederik Vercauteren. Fully homomorphic simd operations. Designs, codes and cryptography, 71(1):57-81, 2014.

[42] Frederik Armknecht, Colin Boyd, Christopher Carr, Kristian Gjøsteen, Angela Jäschke, Christian A Reuter, and Martin Strand. A guide to fully homomorphic encryption. IACR Cryptol. ePrint Arch., 2015:1192, 2015.

The invention claimed is:

1. A method for verifying the execution of requested computation tasks, delegated by a computerized delegator device, to one or more computerized devices executing said tasks, comprising:
   a) defining an input data for each delegated computation task;
   b) adding to said input data, one or more computation fingerprints being executable encrypted input control bits, capable of detecting deviation from each requested computation task;
   c) allowing said delegator to calculate said computation fingerprints once, by executing the requested computation tasks on predetermined random base values, to obtain an a-priori fingerprint result;
   d) coupling said base values to each requested computation task;
   e) allowing said one or more computerized devices to execute each requested computation task along with said base values, for returning an output consisting of a combination of a computed task result section and a calculated fingerprint result section;
   f) verifying said returned output by comparing said a-priori fingerprint result to said calculated fingerprint and accepting said returned output if and only if the returned fingerprint result was identical to said a-priori fingerprint result; and
   g) using said a-priori fingerprint result or new verified result to verify further requested computation tasks delegated to the same one or more computerized devices,
   wherein a computer word granularity, the verification and actual calculation representation sections within the computer word are distinct, such that the verification part is fixed across all input computer words,
   wherein after calculating the value of all the possible rows, the results are summed, where there are zeros for all the rows, except for at most one row, which represents the received encrypted input, such that the calculation of said one row will result in the expected output that corresponds to the input.

2. A method for verifying the execution of requested computation tasks, delegated by a computerized delegator device, to one or more computerized devices executing said tasks, comprising:
   a) defining an input data for each delegated computation task;
   b) adding to said input data, one or more computation fingerprints being executable encrypted input control bits, capable of detecting deviation from each requested computation task;
   c) allowing said delegator to calculate said computation fingerprints once, by executing the requested computation tasks on predetermined random base values, to obtain an a-priori fingerprint result;
   d) coupling said base values to each requested computation task;
   e) allowing said one or more computerized devices to execute each requested computation task along with said base values, for returning an output consisting of a combination of a computed task result section and a calculated fingerprint result section;

f) verifying said returned output by comparing said a-priori fingerprint result to said calculated fingerprint and accepting said returned output if and only if the returned fingerprint result was identical to said a-priori fingerprint result; and g) using said a-priori fingerprint result or new verified result to verify further requested computation tasks delegated to the same one or more computerized devices;

wherein parts of the variables are used for computation verification by fingerprint calculation, while the other parts are used for the actual calculation;

wherein computer word schemes are designed using arithmetic circuits that represent polynomials, wherein the expected result of the fingerprint calculation is reused or reconstructed over different inputs.

3. A method for verifying the execution of requested computation tasks, delegated by a computerized delegator device, to one or more computerized devices executing said tasks, comprising:

a) defining an input data for each delegated computation task;

b) adding to said input data, one or more computation fingerprints being executable encrypted input control bits, capable of detecting deviation from each requested computation task;

c) allowing said delegator to calculate said computation fingerprints once, by executing the requested computation tasks on predetermined random base values, to obtain an a-priori fingerprint result;

d) coupling said base values to each requested computation task;

e) allowing said one or more computerized devices to execute each requested computation task along with said base values, for returning an output consisting of a combination of a computed task result section and a calculated fingerprint result section;

f) verifying said returned output by comparing said a-priori fingerprint result to said calculated fingerprint and accepting said returned output if and only if the returned fingerprint result was identical to said a-priori fingerprint result; and g) using said a-priori fingerprint result or new verified result to verify further requested computation tasks delegated to the same one or more computerized devices, wherein upon detecting a carry operation in the fingerprint result section, a reset default value is assigned for nullifying the computed task result.

4. A method for verifying the execution of requested computation tasks, delegated by a computerized delegator device, to one or more computerized devices executing said tasks, comprising:

a) defining an input data for each delegated computation task;

b) adding to said input data, one or more computation fingerprints being executable encrypted input control bits, capable of detecting deviation from each requested computation task;

c) allowing said delegator to calculate said computation fingerprints once, by executing the requested computation tasks on predetermined random base values, to obtain an a-priori fingerprint result;

d) coupling said base values to each requested computation task;

e) allowing said one or more computerized devices to execute each requested computation task along with said base values, for returning an output consisting of a combination of a computed task result section and a calculated fingerprint result section;

f) verifying said returned output by comparing said a-priori fingerprint result to said calculated fingerprint and accepting said returned output if and only if the returned fingerprint result was identical to said a-priori fingerprint result; and g) using said a-priori fingerprint result or new verified result to verify further requested computation tasks delegated to the same one or more computerized devices, wherein a computing server uses an LUT to convert the inputs to discrete logarithmic values and to exponentiate the result back before adding.

5. A method for verifying the execution of requested computation tasks, delegated by a computerized delegator device, to one or more computerized devices executing said tasks, comprising:

a) defining an input data for each delegated computation task;

b) adding to said input data, one or more computation fingerprints being executable encrypted input control bits, capable of detecting deviation from each requested computation task;

c) allowing said delegator to calculate said computation fingerprints once, by executing the requested computation tasks on predetermined random base values, to obtain an a-priori fingerprint result;

d) coupling said base values to each requested computation task;

e) allowing said one or more computerized devices to execute each requested computation task along with said base values, for returning an output consisting of a combination of a computed task result section and a calculated fingerprint result section;

f) verifying said returned output by comparing said a-priori fingerprint result to said calculated fingerprint and accepting said returned output if and only if the returned fingerprint result was identical to said a-priori fingerprint result; and g) using said a-priori fingerprint result or new verified result to verify further requested computation tasks delegated to the same one or more computerized devices, wherein multiplications of encrypted values are performed by additions of the logarithmic representations of said encrypted values, followed by exponentiation, wherein black box operations that enforce the ordered operations are applied for multiplications exponentiation using logarithmic representation, while preserving computation fingerprints and operating additions.

6. A method for verifying the execution of requested computation tasks, delegated by a computerized delegator device, to one or more computerized devices executing said tasks, comprising:

a) defining an input data for each delegated computation task;

b) adding to said input data, one or more computation fingerprints being executable encrypted input control bits, capable of detecting deviation from each requested computation task;

c) allowing said delegator to calculate said computation fingerprints once, by executing the requested computation tasks on predetermined random base values, to obtain an a-priori fingerprint result;

d) coupling said base values to each requested computation task;

e) allowing said one or more computerized devices to execute each requested computation task along with said base values, for returning an output consisting of a combination of a computed task result section and a calculated fingerprint result section;
f) verifying said returned output by comparing said a-priori fingerprint result to said calculated fingerprint and accepting said returned output if and only if the returned fingerprint result was identical to said a-priori fingerprint result; and
g) using said a-priori fingerprint result or new verified result to verify further requested computation tasks delegated to the same one or more computerized devices, wherein black box additions are performed by the one or more computerized devices, wherein a computational fingerprint is incorporated into SIMD manipulated data structures indicating wrong execution order and overflows.

* * * * *